(12) United States Patent
Martin et al.

(10) Patent No.: US 12,496,637 B2
(45) Date of Patent: Dec. 16, 2025

(54) LASER POWDER BED FUSION ADDITIVE MANUFACTURING IN-PROCESS MONITORING AND OPTIMIZATION USING THERMIONIC EMISSION DETECTION

(71) Applicant: Lawrence Livermore National Security, LLC, Livermore, CA (US)

(72) Inventors: Aiden Alexander Martin, Walnut Creek, CA (US); Philip James Depond, San Mateo, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1345 days.

(21) Appl. No.: 17/127,271

(22) Filed: Dec. 18, 2020

(65) Prior Publication Data
US 2021/0138551 A1    May 13, 2021

Related U.S. Application Data

(63) Continuation-in-part of application No. PCT/US2018/039745, filed on Jun. 27, 2018.

(51) Int. Cl.
*B22F 10/28* (2021.01)
*B22F 10/366* (2021.01)
(Continued)

(52) U.S. Cl.
CPC ............ *B22F 10/28* (2021.01); *B22F 10/366* (2021.01); *B22F 10/368* (2021.01); *B22F 10/85* (2021.01);
(Continued)

(58) Field of Classification Search
CPC ...... B22F 10/28; B22F 10/366; B22F 10/368; B22F 10/85; B22F 12/41; B22F 10/31;
(Continued)

(56) References Cited

U.S. PATENT DOCUMENTS

| 2009/0152771 A1 | 6/2009 | Philippi et al. |
| 2011/0114839 A1 | 5/2011 | Stecker et al. |
| (Continued) | | |

FOREIGN PATENT DOCUMENTS

| CN | 106626378 A | 5/2017 |
| EP | 1634694 A2 | 3/2006 |
| WO | WO-2020005228 A1 | 1/2020 |

OTHER PUBLICATIONS

International Search Report and Written Opinion regarding International Patent Application PCT/US2021/062621, dated Apr. 1, 2022.

(Continued)

*Primary Examiner* — John A Hevey
(74) *Attorney, Agent, or Firm* — HARNESS, DICKEY & PIERCE, P.L.C.

(57) ABSTRACT

The present disclosure relates to a system which may have an electronic controller, an optical light source controlled by the electronic controller which generates a beam having an output power level, and a current measuring subsystem (CMS) electrically coupled to a conductive substrate (e.g., metal substrate (MS)) while a powder bed layer (PBL) is deposited on the MS. The CMS may be in communication with the electronic controller and detects a current flow as at least one of the MS or the PBL is heated when the beam is scanned over the PBL. The CMS generates a current flow signal in accordance with the detected current flow. The current flow signal is used by the electronic controller to determine when the temperature of at least one of the substrate or the PBL is at least one of above or below a desired temperature.

17 Claims, 6 Drawing Sheets

(51) Int. Cl.
   B22F 10/368    (2021.01)
   B22F 10/85     (2021.01)
   B22F 12/41     (2021.01)
   B22F 12/90     (2021.01)
   B33Y 10/00     (2015.01)
   B33Y 30/00     (2015.01)
   B33Y 50/02     (2015.01)
   B22F 10/31     (2021.01)

(52) U.S. Cl.
   CPC ............. *B22F 12/41* (2021.01); *B33Y 10/00* (2014.12); *B33Y 30/00* (2014.12); *B33Y 50/02* (2014.12); *B22F 10/31* (2021.01); *B22F 12/90* (2021.01)

(58) Field of Classification Search
   CPC .. B22F 12/90; B22F 2202/06; B22F 2203/03; B22F 2203/11; B22F 2999/00; B33Y 10/00; B33Y 30/00; B33Y 50/02; Y02P 10/25
   See application file for complete search history.

(56) References Cited

U.S. PATENT DOCUMENTS

| | | |
|---|---|---|
| 2014/0361464 A1 | 12/2014 | Holcomb |
| 2016/0184893 A1 | 6/2016 | Dave et al. |
| 2016/0339519 A1 | 11/2016 | Sargent |
| 2017/0203517 A1 | 7/2017 | Crear et al. |
| 2018/0264590 A1* | 9/2018 | Goldfine ............... G01K 13/10 |
| 2020/0215810 A1* | 7/2020 | Sutcliffe ............... B22F 10/368 |
| 2021/0138551 A1 | 5/2021 | Martin et al. |

OTHER PUBLICATIONS

International Search Report and Written Opinion, mailed Mar. 19, 2019, 15 pages.

C. McGeehin, Additive Manufacturing with Metal Powders 2019, SmarTech Analysis https:/www.smartechanalysis.com/reports/additive-manufacturing-with-metal-powders-2019.

S. K. Everton, M. Hirsch, P. Stravroulakis, R. K. Leach, A. T. Clare, Review of in-situ process monitoring and in-situ metrology for metal additive manufacturing, Mater. Des. 95 (2016) 431-445. https://doi.org/10.1016/j.matdes.2016.01.099.

A. A. Martin et al. Dynamics of pore formation during laser powder bed fusion additive manufacturing, Nat. Commun. 10 (2019) 1987, https://doi.org/10.1038/s41467-019-10009-2.

Tapia, G. & Elwany, A. A Review on Process Monitoring and Control in Metal-Based Additive Manufacturing. Journal of Manufacturing Science and Engineering, Dec. 2014, vol. 136, pp. 060801-1-060801-10.

Everton, S. K., Hirsch, M., Stravroulakis, P., Leach, R. K. & Clare, A. T. Review of in-situ process monitoring and in-situ metrology for metal additive manufacturing. Materials & Design 95, 431-445 (2016).

Nassar, A. & Reutzel, E. W. A Proposed Digital Thread for Additive Manufacturing, Solid Freeform Fabrication, (2013), 19-43.

https://www.ge.com/reports/post/116402870270/the-faa-cleared-the-first-3d-printed-part-to-fly-in a commerical jet engine from GE, Advanced Manufacturing, Apr. 14, 2015.

Marco, G., & Colosimo, B.M. Process defects and in situ monitoring methods in metal powder bed fusion: a review. Measurement Science and Technology 28, 044005 (2017).

Clijsters, S., Craeghs, T., Buls, S., Kempen, K. & Kruth, J.-P. In situ quality control of the selective laser melting process using a high-speed, real-time melt pool monitoring system. The International Journal of Advanced Manufacturing Technology 75, 1089-1101 (2014).

DebRoy, T. et al. Additive manufacturing of metallic components—Process, structure and properties. Progress in Materials Science 92, 112-224 (2018).

Scime, L. & Beuth, J. Anomaly detection and classification in a laser powder bed additive manufacturing process using a trained computer vision algorithm. Additive Manufacturing 19, 114-126 (2018).

Kleszczynski, S. et al. Improving Process Stability of Laser Beam Melting Systems. In Fraunhofer Direct Digital Manufacturing Conference (2014).

Ly, S., Rubenchik, A. M., Khairallah, S. A., Guss, G. & Matthews, M. J. Metal vapor micro-jet controls material redistribution in laser powder bed fusion additive manufacturing. Scientific Reports 7, 4085 (2017).

Matthews, M.J., et al. Denudation of metal powder layers in laser powder bed fusion processes. Acta Materialia 114, 33-42 (2016).

Craeghs, T., Clijsters, S., Kruth, J.-P., Bechmann, F. & Ebert, M.-C. Detection of Process Failures in Layerwise Laser Melting with Optical Process Monitoring. Physics Procedia 39, 753-759 (2012).

Kruth, J.P.; Duflou, J.; Mercelis, P. et al.: On-line monitoring and process control in Selective Laser Melting and laser cutting. Laser Assisted Net Shape Engineering 5, Proceedings of the LANE 2007, p. 23-37.

Lott, P. et al. Design of an Optical system for the In Situ Process Monitoring of Selective Laser Melting (SLM). Physics Procedia 12, 683-690 (2011).

Hirsch, M. et al. Targeted rework strategies for powder bed additive manufacture. Additive Manufacturing 19, 127-133 (2018).

Zhang, B., Ziegert, J., Farahi, F. & Davies, A. In situ surface topography of laser powder bed fusion using fringe projection. Additive Manufacturing 12, 100-107 (2016).

Fercher, A.F., et al. Optical coherence tomography—principles and applications, Rep. Prog. Phys. 66 239 (2003).

* cited by examiner

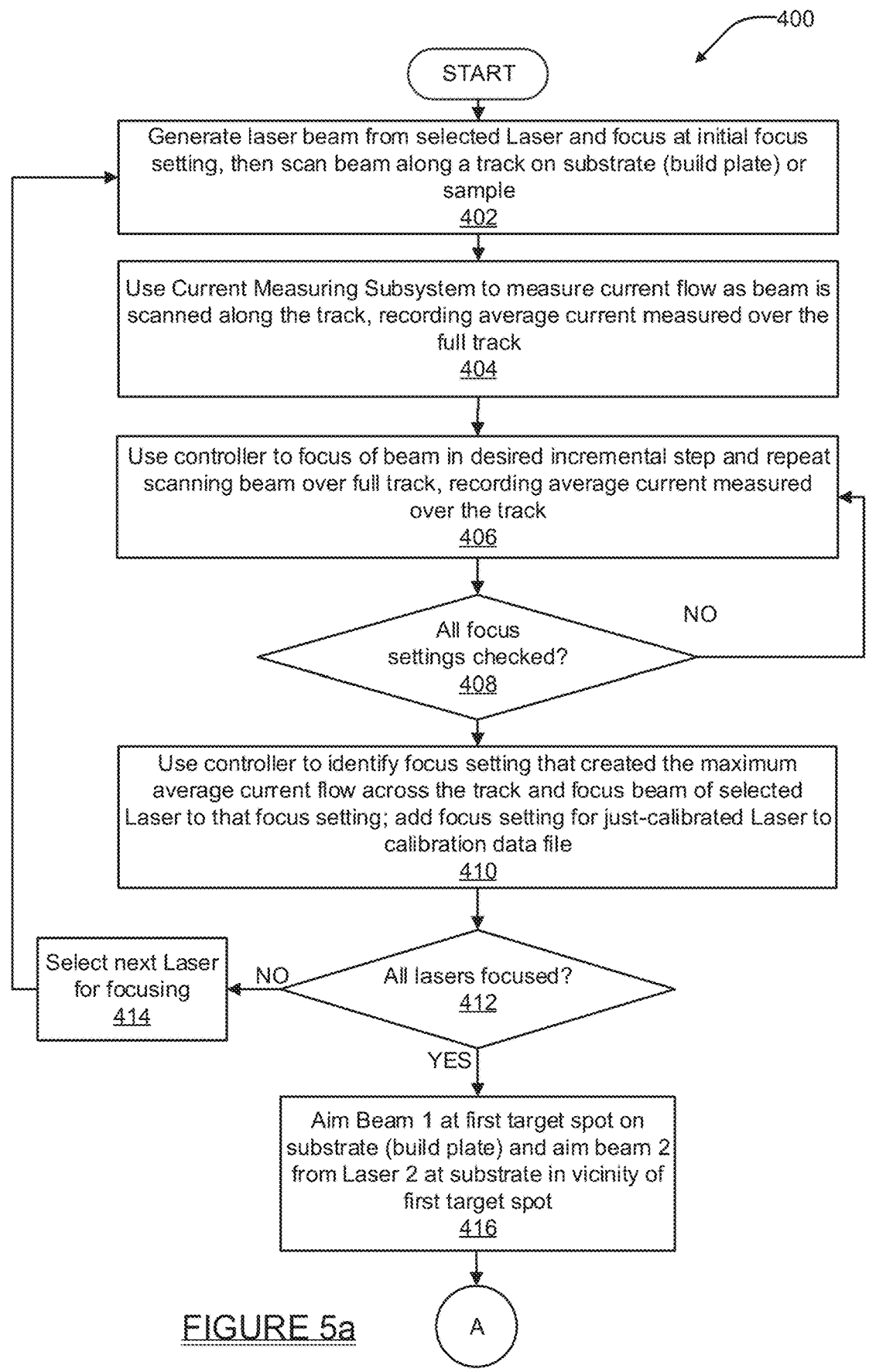

LASER POWDER BED FUSION ADDITIVE MANUFACTURING IN-PROCESS MONITORING AND OPTIMIZATION USING THERMIONIC EMISSION DETECTION

CROSS REFERENCE TO RELATED APPLICATIONS

The present application is a bypass continuation-in-part of PCT Application No. PCT/US2018/039745, filed Jun. 27, 2018, which is incorporated by reference herein into the present application in full.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to additive manufacturing systems which make use an optical light source to heat a powder bed material layer and to melt the powder bed, and more particularly to systems and methods which perform in situ monitoring of thermionic emission from a powder bed and substrate surface being acted on by an optical light source, and using information obtained during the monitoring for quality control and/or quality assurance, to enhance or optimize characteristics of a material layer formed as the powder bed is melted and solidifies.

BACKGROUND

This section provides background information related to the present disclosure which is not necessarily prior art.

Additive manufacturing (AM) is rapidly gaining in popularity for the manufacture of a wide variety of components, parts and structures. Nevertheless, AM stands to benefit significantly from increased application of process monitoring approaches due to the stochastic nature of defects produced during AM processes, and because the primary applications of AM are in industries with stringent materials requirements. Moreover, since the vast majority of AM processes are layer-by-layer, in situ monitoring provides a unique view into the interior of a built part during its construction, which would otherwise be subsequently difficult to access once the manufacture of the part is completed. Process monitoring data collected voxel-by-voxel during a build can provide a so-called "digital thread" for increased confidence in final parts that is fundamentally part of today's Industry 4.0 paradigm. Improved monitoring solutions along with more predictive models and optimal laser sources have helped to push metal AM, from a mostly prototyping technology to full scale part production. However, fundamental challenges still limit widespread industrial adoption of AM, particularly in performance critical applications, where qualification of AM-produced parts remains a significant obstacle.

In an AM process, many defects within a manufactured part originate from morphological features between layers, such as spatter, keyhole/lack of fusion porosity, part deformation during the build, and other unwanted in-homogeneities in the powder bed surface. These defects can lead to catastrophic part failure and therefore must be avoided.

Recently, optical diagnostics have been employed for one type of AM process known as Laser Power Bed Fusion ("LPBF"). The optical diagnostics have been employed in an effort to detect defects as they occur, to reduce cycle time and to improve the fundamental understanding of the process-structure-property relationship of a part made using LPBF. High resolution imaging of the powder bed surface to detect and classify morphological anomalies such as powder spreading flaws and elevated regions has been investigated and show promise in identifying catastrophic errors, provided the right thresholding or ground truths are developed. High speed imaging of laser-powder interactions illustrates the complex dynamics of spatter and the vapor plume, which are dominated by a metal vapor jet caused by recoil pressure, but do not capture surface structure at the part scale. Coaxial process monitoring, where the melt pool region is viewed through the process laser, has been implemented as a method to understand the relationship between melt pool dimensions and reflected incandescence intensity to solidified morphology, sub-surface and topographic defects.

Correlations of process signatures measured by optical imaging and photodiode measurements of thermal emission to defects measured ex situ by x-ray computed tomography demonstrate that optical signatures can, in principle, be used as predictive measures of process quality. Optoacoustic and optical metrology tools such as structured light have also been developed to identify defects during, or in between, layer processing. However, such tools still present significant obstacles to integration in a full-scale LPBF machine because they require ex situ platforms, are time consuming, or have limited measurement area.

Spectral-domain Optical Coherence Tomography (SD-OCT) is another method that has been used for optical metrology of the LPBF process. SD-OCT uses spectrally dispersive elements rather than distance measurements of a moving reference arm, thus permitting sampling rates in excess of 50 kHz. Therefore, while SD-OCT is a promising method for high speed large area optical metrology, it has not proven capable of making operando measurements of the melt pool region. Efforts and experiences by others in this area have noted detailed categorizations of defects, the sources of the categorized defects, and process monitoring approaches, all of which make clear the continued necessity for nondestructive defect detection (NDT), as the specification standards landscape for NDT is still unsettled.

Still another challenge with existing AM systems is the focusing of a laser beam. In this regard it is typically important that the "spot" formed by a beam is focused to a minimum spot size. This focusing operation has typically been a complex procedure which is performed ex situ before beginning a manufacturing operation using the beam. Even more challenging is the co-alignment of two or more lasers so that the "spot" formed by a second laser is focused to a minimum point size, as well as perfectly, or nearly perfectly, co-aligned with the spot produced by a first laser. The optimization of laser focus and the co-alignment of multiple lasers across the entire build plate during an AM manufacturing process is of primary importance to ensure components are built under identical conditions when using multiple lasers in a manufacturing operation, such as in a laser powder bed fusion AM manufacturing operation. With present day focusing and alignment techniques, these alignment tasks require extensive ex situ analysis and are not routinely performed before or during each component build. As such, there can be variations between the build quality of components built using the same system but at different times, due to focusing variations of a laser and/or co-alignment errors of multiple lasers.

SUMMARY

This section provides a general summary of the disclosure, and is not a comprehensive disclosure of its full scope or all of its features.

In one aspect the present disclosure relates to a system comprising an electronic controller, an optical light source controlled by the electronic controller to generate a beam having an output power level, and a current measuring subsystem. The current measuring subsystem may be in electrical communication with at least one of a conductive substrate or a powder bed layer deposited on the conductive substrate, and also in communication with the electronic controller. The current measuring subsystem may operate to detect a current flow as at least one of the conductive substrate or the powder bed layer is heated as the beam from the optical light source is scanned, and to generate a current flow signal in accordance with the detected current flow. The electronic controller may be configured to receive the current flow signal and to use the current flow signal to determine when a detected temperature of at least one of the conductive substrate or the powder bed layer is at least one of above or below a desired temperature.

In another aspect the present disclosure relates to an additive manufacturing system which may comprise an electronic controller, a memory for storing predetermined temperature information and a laser controlled by the electronic controller to generate a laser beam having an output power level. A current measuring subsystem may also be included which is electrically in communication with at least one of a conductive substrate and a powder bed layer deposited on the conductive substrate, and also in communication with the electronic controller. The current measuring subsystem may operate to detect a current flow as at least one of the conductive substrate or the powder bed layer is heated as the laser is scanned over at least one of the conductive substrate or the powder bed layer, and to generate a current flow signal in accordance with the detected current flow. The electronic controller may be configured to receive the current flow signal and to control the output power level of the laser to maintain a desired current level which ensures that at least one of the substrate or the powder bed layer is maintained at least at one of a desired temperature level or within a desired temperature range.

In still another aspect the present disclosure relates to a method for additively manufacturing a part. The method may comprise using a laser beam to heat at least one of a conductive substrate or a powder bed of particles resting on the conductive substrate. The method may further include using a current measuring subsystem in communication with at least one of the conductive substrate or the powder bed, to measure a current flow produced as a result of thermionic emission as the laser beam is scanned over at least one of the conductive substrate or the powder bed, and heats at least one of the conductive substrate or the powder bed. The method may further include causing the electronic control to use the measured current flow to control an output power level of the laser beam while scanning the laser beam over the powder bed to at least one of eliminate or mitigate, at least one of an over-temperature condition or an under-temperature condition, of at least one of the substrate or the powder bed layer, during the scan.

In still another aspect the present disclosure relates to a system for calibrating a laser. The system may comprise an electronic controller, an optical light source and a current measuring subsystem. The optical light source may be controlled by the electronic controller to generate a beam having an output power level, the beam being directed at one of a substrate or a laser meltable powder bed layer disposed on the substrate. The current measuring subsystem is in electrical communication with at least one of a conductive substrate or a powder bed layer deposited on the conductive substrate, and in further communication with the electronic controller. The current measuring subsystem is configured to detect a current flow resulting from thermionic emission of electrons as at least one of the conductive substrate or the powder bed layer is heated by the beam, and to generate a current flow signal in accordance therewith. The electronic controller is configured to receive the current flow signal and to use the current flow signal to focus the beam.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4:
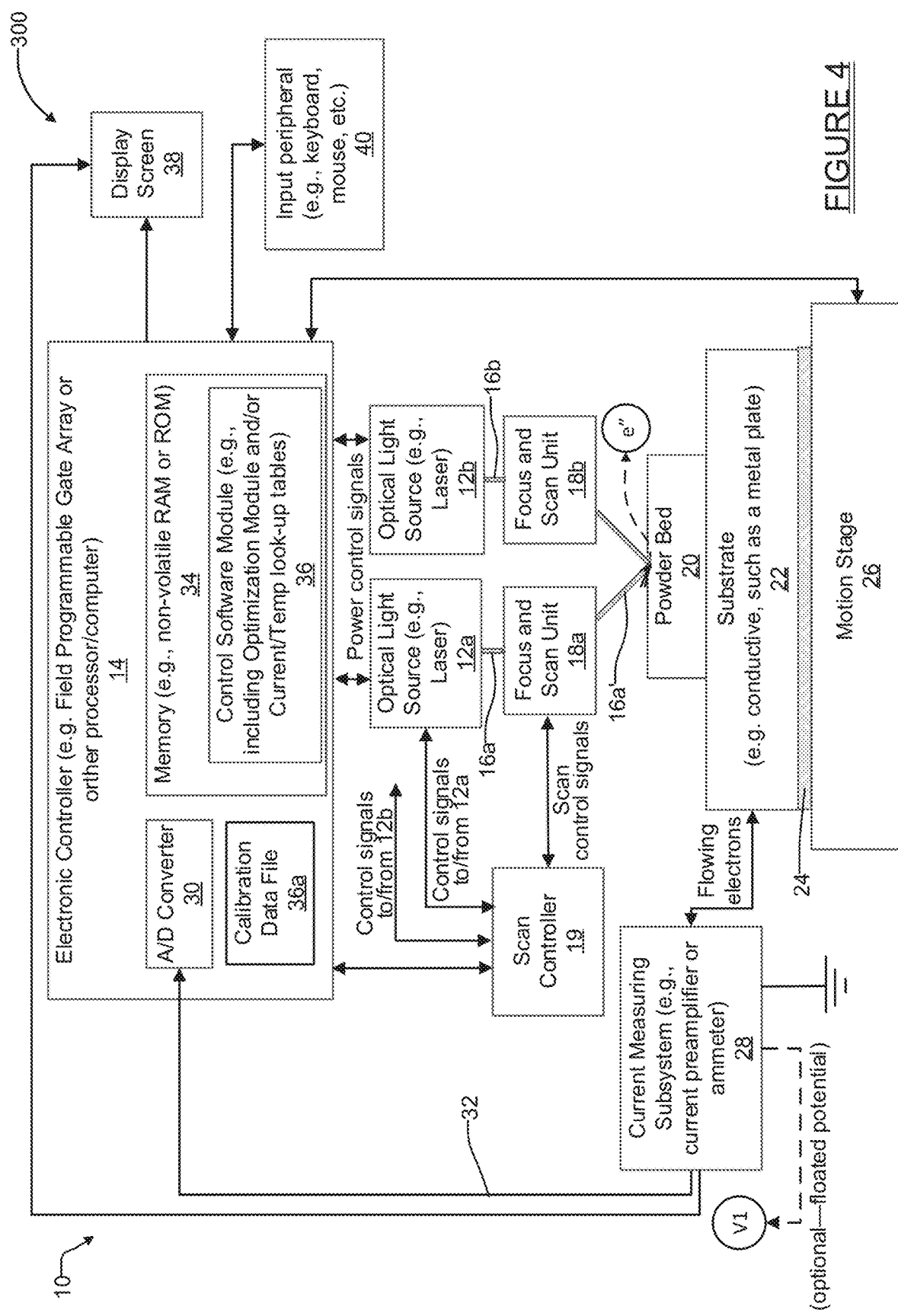
Figure 5B:
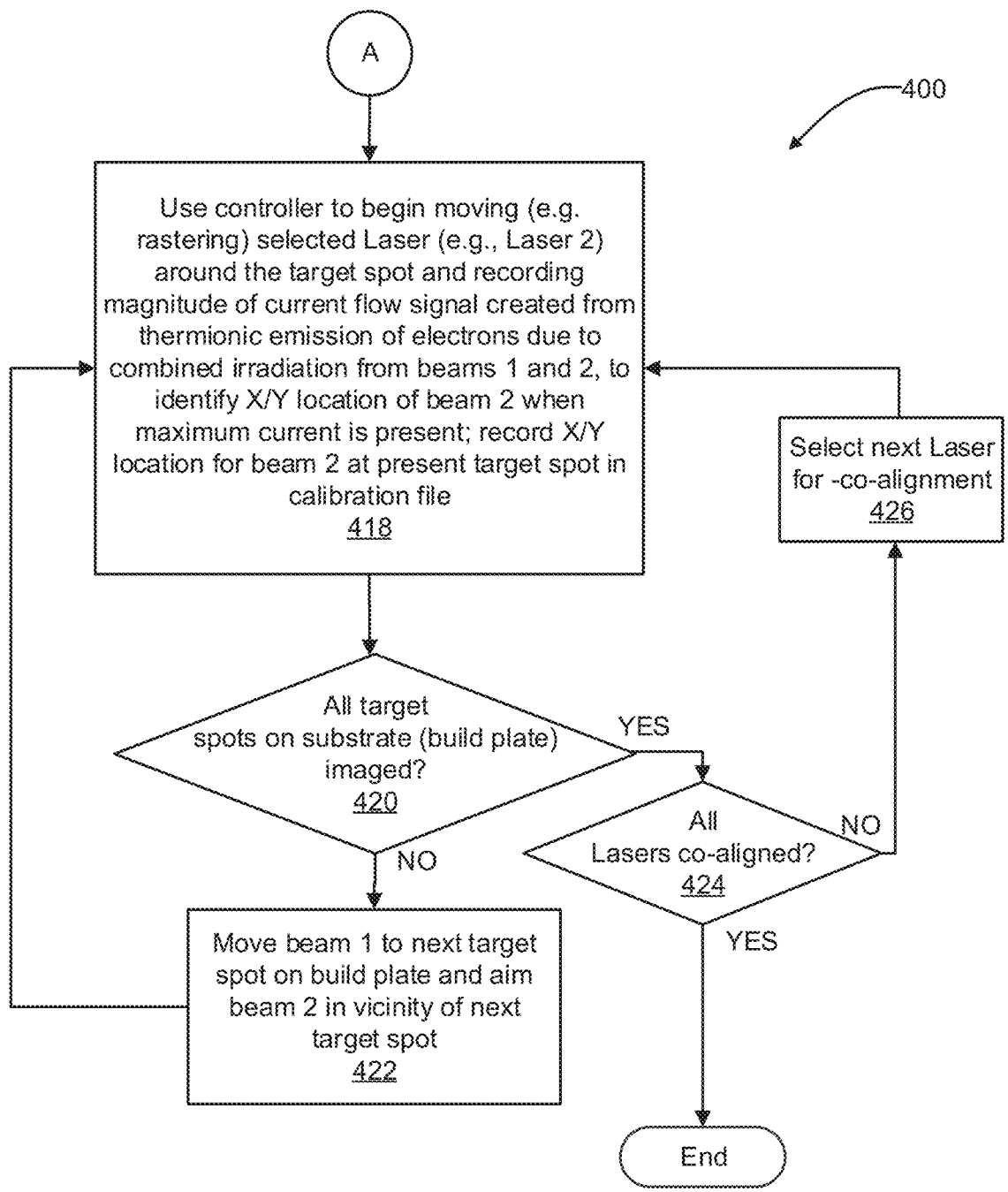

FIG. 4 is high level block diagram of on another embodiment of a system in accordance with the present disclosure where the system incorporates dual lasers and dual focus/scan units; and FIGS. 5a and 5b represent a high level flowchart illustrating various operations that may be carried out using the system of FIG. 4 in focusing a first beam, as well as co-aligning the beams from both of the lasers of the system.

Corresponding reference numerals indicate corresponding parts throughout the several views of the drawings.

DETAILED DESCRIPTION

Example embodiments will now be described more fully with reference to the accompanying drawings.

Figure 1:
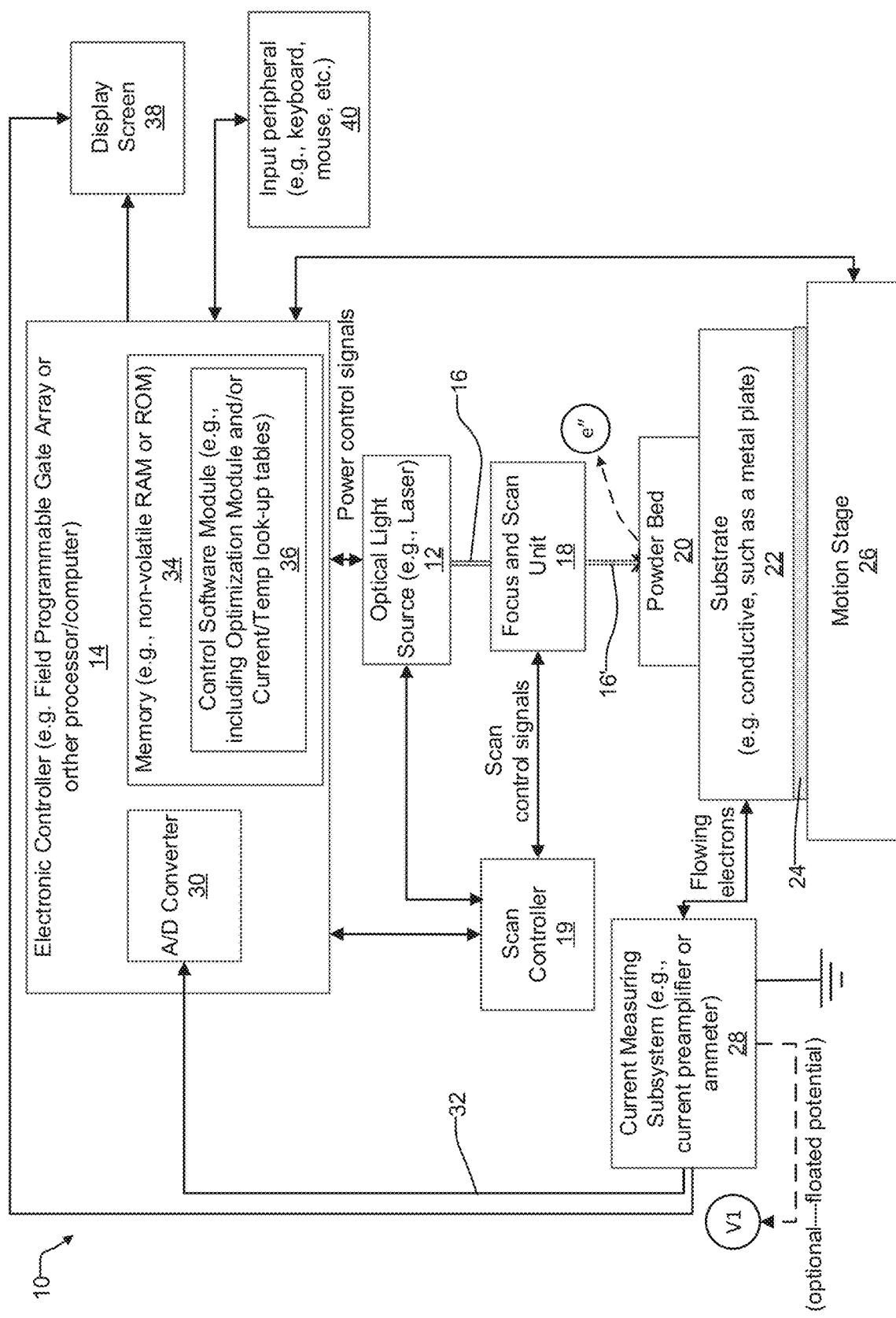
FIG. 1 is a high level schematic drawing of one embodiment of the present disclosure showing an additive manufacturing (AM) system in the form of a Laser Powder Bed Fusion (LPBF) system which incorporates an in situ monitoring subsystem.

Referring to FIG. 1, a system 10 is shown in accordance with one example of the present disclosure. In this example the system 10 forms an additive manufacturing system, and more specifically a Laser Powder Bed Fusion ("LPBF") system. The system 10 may include an optical light source 12, for example a laser (hereinafter referred to for convenience as "laser 12") having sufficient power to melt metal powder or other high temperature materials. In one example the laser 12 may be a diode or diode to fiber laser. As another example, the laser 12 may be a 500 W, 1070 nm, Ytterbium doped YAG fiber laser. The laser 12 may have its power controlled by an electronic controller 14. The laser 12 receives laser power control signals from the electronic controller 14 and generates a laser beam 16 which may be applied to a laser focus and scan unit (e.g., focusing lens) 18 which focuses the beam 16 to a beam 16' having a desired spot size. The laser focus and scan unit 18 may be controlled by a separate laser scan controller 19 which may or may not be in communication with the electronic controller 14. In either event, the beam 16' is directed at a powder bed 20 by the laser focus and scan unit 18, where the powder bed 20 is disposed on an electrically conductive substrate 22. The powder bed 20 may be formed by powder particles, for example, metallic powder particles. The substrate 22 is typically a metallic substrate. The substrate 22 rests on an electrically non-conductive surface layer 24, which may in turn be supported by a motion stage 26. Alternatively, the motion stage 26 may simply be a fixed material support surface which remains stationary throughout operation of the system 10. However, if the motion stage 26 is included, then it is typically movable in the Z axis to facilitate the deposition of each subsequent powder material layer as the part is built layer by layer. However, in some implementations the motion stage 26 may be movable in the X-Y axes as well. In either event, if the motion stage 26 is included it may be controlled by suitable control signals, for example control signals from the electronic controller 14, so that the beam 16' may be scanned over the powder bed 20 as needed to form each layer of a part. Alternatively, the laser 12 and the laser scan controller 18 may be moved while the substrate 22 is held stationary during operation of the system 10 when making a part. Both implementations are envisioned by the present disclosure.

The system 10 may also include a current measuring subsystem 28, for example a current preamplifier or possibly an ammeter 28, in communication with the substrate 22 for reading a current flow created by electrons being displaced as the powder bed 20 is heated by the laser 12. The electrons are displaced by thermionic emission as the metallic particles forming the powder bed 20 are heated. Merely for convenience, the current measuring subsystem 28 will be referred to as "the current preamplifier 28" throughout the following discussion. The current flow signal, which in this example is an analog signal, may be transmitted to an analog-to-digital ("A/D") converter 30 via a suitable conductor or electrical cable 32. The A/D converter 30 in this example is shown incorporated in the electronic controller 14, however, it may alternatively be included in a circuit together with the current preamplifier 28, or possibly even be included as a fully separate subsystem.

The electronic controller 14 may be provided as a field programmable gate array (FPGA), or alternatively as any other suitable form of processor/computing component. In one embodiment the electronic controller 14 may include a non-volatile memory (e.g., RAM and/or ROM) 34 for storing a control software module 36. The control software module 36 may include one or more distinct software modules and/or look-up table(s) for use by the electronic controller 14 during its operation. Optionally, a display screen (e.g., LED, CRT, etc.) 38 may be incorporated along with an optional user input peripheral (e.g., keyboard, mouse, etc.) 40. The display screen 38 (e.g., LED screen, LCD screen or Cathode Ray Tube (CRT)) may be used by an operator to monitor current and/or temperature data during a scanning operation to help control the system 10 as a part is being formed using the powder bed 20. Similarly, the input peripheral 40 may be provided to enable the user to input at least one of data or commands to the electronic controller 14 during operation of the system 10 or during a calibration operation before making a part. The part may be formed in a layer-by-layer process where each layer is heated by the laser beam 16' to fuse select portions or all of the powder layer, and then a subsequent quantity of powdered material is added on top of the just-fused layer to form a new subsequent layer. This operation may be repeated (i.e., depositing new powder layer, fusing select portions or all of the layer, depositing new powder layer, fusing, etc.) until a three dimensional part is formed on the substrate 22.

The system 10 takes advantage of the fact that when the laser 12 heats the powder bed 20 using the laser beam 16', thermionic emission takes place in which electrons are emitted from the heated surface of the powder bed 20. The powder bed 20 typically includes metallic particles in powder form. The electrical connection of the current preamplifier 28 between ground and the substrate 22 enables electrons to flow to the substrate 22 and to the depleted work surface (i.e., to the powder bed 20) from ground through the current preamplifier. However, it will be appreciated that electrons may not always flow from the current preamplifier 28 to the substrate 22 and to the powder bed 20 (i.e., depleted work surface). Interactions with the gas produced during the heating may cause the electrons to flow back into the substrate 22. Also, in some cases it may be preferable to "float" the substrate 22/powder bed 20 at a desired potential (e.g., either a positive voltage or a negative voltage), which is indicated in FIG. 1 by voltage source V1. In any event, the current flow is measured by the current preamplifier 28 and the current preamplifier provides an analog signal representative of same to the electronic controller 14. The A/D converter 30 converts this analog signal into a digitized signal. The current measured is proportional to the temperature. It is not critical that the exact temperature of the powder bed 20 and/or substrate 22 is known, but rather simply a detected change in temperature is required (e.g., a change from a "known acceptable" or "steady state" temperature is acceptable). The digitized signal may therefore be representative of a temperature of the powder bed 20 at specific locations of the powder bed 20 as the laser beam 16' is scanned over the powder bed 20. The electronic controller 14 uses the control software module 36 to evaluate the digitized signal and, in one embodiment, uses it to determine if an under-temperature condition or over-temperature condition exists during the scanning of the powder bed 20. In one embodiment the electronic controller 14 adjusts the laser power control signals applied to the laser 12 to eliminate or mitigate the under-temperature or over-temperature condition(s) during the scanning. Over-temperature and/or under-temperature information may be displayed, in one embodiment, in real time on the display screen 38.

Figure 2:
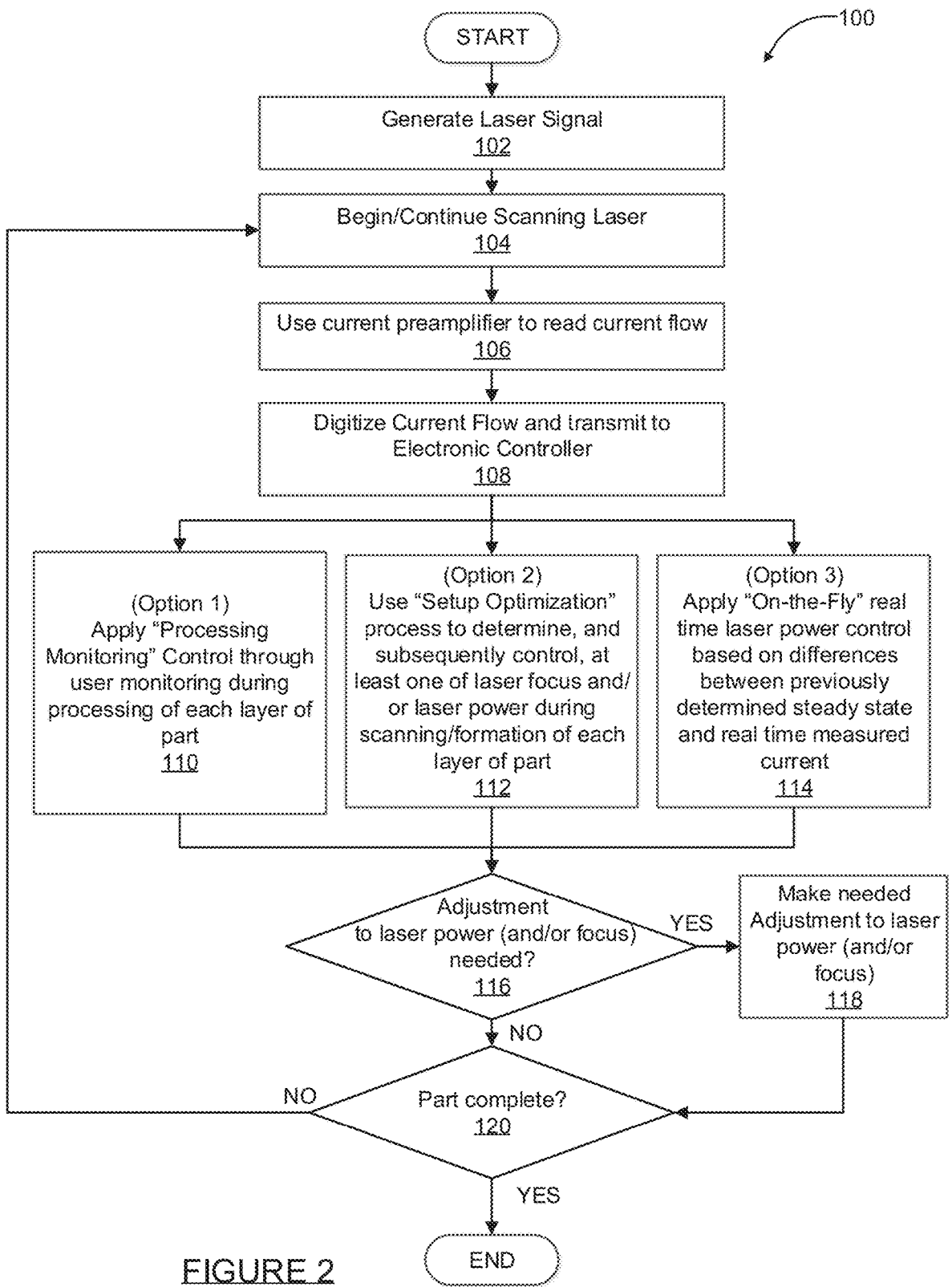
FIG. 2 is a flowchart illustrating various operations that may be performed by the system of FIG. 1 in producing a part.

Referring to FIG. 2, a high level flowchart 100 is shown of operations that may be performed by the system of FIG. 1. At operation 102 the laser 12 generates the laser beam 16'. At operation 104 the laser scan controller 19 is used to control the laser focus and scan unit 18 to scan the laser beam 16' across the powder bed 20. The current preamplifier 28 reads the current flow and provides an analog signal representative of same to the A/D converter 30 of the electronic controller 14.

The flowchart of FIG. 2 illustrates three different control methodologies for making use of the digitized signal from the A/D converter 30: "Process Monitoring" control; "Setup Optimization" control; and "On-the-Fly" control. The control software module 36 may include suitable software for one, two or all of these control methodologies. The Process Monitoring control may be executed at operation 110 in FIG. 2 and may involve using the current preamplifier 28 to measure current as a function of time during processing (i.e., fusing) of the powder bed 20. The output (e.g., temperature) may be displayed on the display screen 38 and the operator may identify if the measured temperature is within a predetermined normal or expected range for the laser/powder bed material, conditions. At operation 116, the user may determine or identify areas of over-temperature or under-temperature to known (i.e., predetermined) temperature parameters. At operation 118, the user may use the input peripheral 40 to input any needed laser power changes to modify the laser power control signals applied to the laser 12 as needed to increase or decrease the power of the laser beam 16'. Optionally, operations 116 and 118 may instead involve the use of a "smart" system that performs the operation of determining and generating any needed laser power changes via machine learning software or other like software. In either case, if the part is not complete, as indicated at operation 120, then operations 104-110 and 116-120 may be repeated until the part is complete.

The "Setup Optimization" of operation 112 in FIG. 2 is the second control option for the system 10. The Setup Optimization operation 112 may instead involve a calibration-like procedure which is performed before the system 10 is used to make a part. This may involve calibrating laser 12 focus by scanning the laser scan unit 18 through a predefined range while the laser beam 16' is directed at the substrate 22 (e.g., which may be a metal plate), and measuring the resulting current flow using the ammeter 28. The optimum laser focus point occurs at the maximum measured current. Areas where the current increases above the steady state or "known good" current may be automatically identified and the laser power adjusted in these regions, with such laser power adjustments saved to the memory 34 for subsequent recall and use by the electronic controller 14 during a subsequent scan. The laser scan process is repeated, and the laser power adjusted, until the measured current is constant for all regions of the scan pattern. As such, this process may involve the electronic controller 14 continuously comparing the measured current to a predetermined current range stored in the memory 34 and associated with the "Setup Optimization" control routine, as a scan is being carried out, and from this comparison any changes in laser power, as well as specific locations during the scan noted where such laser power changes are needed, are stored by the electronic controller 14 so that same can be applied during the process of actually heating and fusing a powder bed layer. In effect, a laser power "map" is created which identifies any area or region during a scan where laser power needs to be temporarily increased or decreased, which is used by the electronic controller 14 during every subsequent scan to apply the needed laser power corrections. With "Option 2" described in operation 112, the needed adjustment in operation 116 may involve the power and/or the laser focus, and the actual adjustment made in operation 118 may involve the laser power and/or laser focus.

Operation 114 in FIG. 2 is the third control option which provides closed loop, "on-the-fly" control over power applied to the laser beam 16'. This methodology involves using the electronic controller 14 to compare the measured steady state current in real-time, during processing of the powder bed 20. This embodiment may require the electronic controller 14 to be provided in the form of a Field Programmable Gate Array (FPGA) to provide the necessary processing power and speed. The laser output power level is adjusted by the electronic controller 14 in real time as the laser beam 16' is being scanned over the powder bed 20. The on-the-fly control methodology may involve translating the digitized electrical signals from the A/D converter 30 into corresponding temperature signals and then comparing the temperature signals to a predetermined temperature threshold value to determine if laser 12 power needs to be decreased or increased. Alternatively, the temperature signals could be compared to a predetermined, desired temperature range within which it is desired to maintain the detected temperature during all or part of a scan. Optionally, one or more look-up tables of temperature/laser power may be stored in the memory 34 and used by the electronic controller 14 to apply the needed laser power correction signals to the laser 12. Accordingly, the on-the-fly control methodology may be employed using a pure closed loop control methodology, or optionally an open loop control methodology using look-up table(s) or other stored information. But in either instance, the electronic controller 14 monitors the temperature of the powder bed 20 during the scan, in real time, and applies the laser power control signals to the laser 12, in real time, to maintain the temperature of the power bed within a predetermined temperature range throughout the entire scan of the powder bed.

With the on-the-fly option of operation 114 in FIG. 2, it will be appreciated that the electronic controller 14 may be used to automate operations 116, 118 and 120. Accordingly, in this implementation, the system 10 may not require any user involvement while a part is being constructed using the system 10. It will be appreciated that in some instances the memory 34 may have suitable software for implementing two or more of the above described control methodologies at operations 110, 112 and 114. As such, the system 10 is not limited to use with only one of the above described control methodologies at a time. It is also possible that modifications of one or more of the control methodologies 110, 112 and 114 may be implemented without departing from the spirit and scope of the present disclosure. Each of the methodologies of operations 110, 112 and 114 enable laser power correction signals to be applied, in situ, when forming each layer of a multi-layer 3D part.

Figure 3:
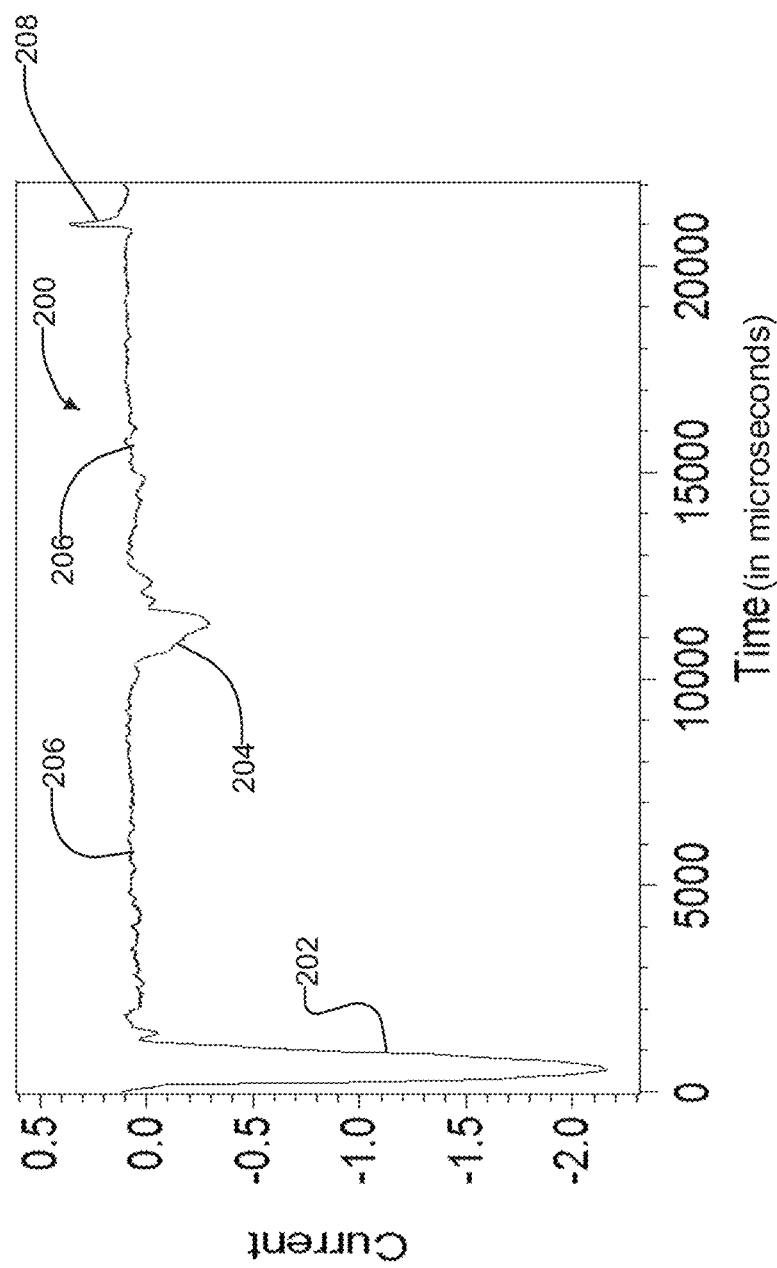
FIG. 3 is a graph illustrating one example of current flow generated versus time during a laser scan of the powder bed.

FIG. 3 illustrates a graph of a waveform 200 to show one example of current flow versus time that results when the laser beam 16' is scanned over the powder bed 20. In this example the dips 202 and 204 in the waveform 200 represent points of overheating of the powder bed 20. The relatively steady state portions 206 represent a temperature at or under a desired, predetermined temperature, and portion 208 represents turning off of the laser at the end of a track. Knowing the amount of overheating or under-heating, as well as exactly at what location(s) such events occur, enables the system 10 to apply the needed correction to the laser 12 power, at specific points or locations during the scan, to produce a relatively steady state temperature during the entire scan of each powder bed layer when making a part in a layer-by-layer process.

The system 10 and method of the present disclosure therefore provides a system with an in-process monitoring and power adjustment tool for use in a laser powder bed fusion platform which enables in situ modifications to be made to the laser power to optimize the temperature of the powder bed 20 across the entire scan. The system 10 and method provides a number of important advantages over previously designed systems. For one, the signal detection method described herein is relatively inexpensive to implement into a LPBF system when compared to other methods. The current signal generated during scanning can also be measured with high bandwidth (high sampling rate, up to 1 MHz or possibly even higher). The current signal can be measured by the system 10 during processing over all build length scales (i.e., over an entire layer of virtually any size). The current output signal generated by the system 10 is also relatively straightforward to interpret, and is easily coupled to suitable processing electronics (e.g., electronic controller 14) for on-the-fly control and automation of applied laser power corrections. The results are reducible to fundamental physical equations and the temperature resolved from the measured current, for example, using the Richardson-Dushman relationship and material specific constants.

Referring to FIG. 4, there is shown a system 300 in accordance with another embodiment of the present disclosure. The system 300 in this example incorporates many of the components of the system 10, and therefore the system shown uses the same reference number as those used in FIG. 1 for components which are identical to those described in connection with the system 10 of FIG. 1. The system 300, however, makes use of two optical light sources 12a and 12b, which in this example may be identical in construction and operation, but need not necessarily be identical in either of construction or operation. The system 300 also makes use of two focus and scan units 18a and 18b, each being associated with a respective one of the lasers 12a and 12b. Thus, laser 12a feeds the beam 16a' to the focus and scan unit, while laser 12b feeds the beam 16b' to the focus and scan unit 318b. Both lasers 12a and 12b may be in communication (uni-directional or bi-directional communication) with the electronic controller 14, such that each may have its output power controlled by the electronic controller 14 and optionally may provide a feedback signal to the electronic controller 14 if closed loop feedback is used for the power control.

A focus of each laser 12a and 12b may be initially carried out by first moving the beam 16a' from the laser 12a along a track on the substrate 22 (i.e., build plate). This may be explained with reference to flowchart 400 in FIG. 5a. Initially at operation 402, laser beam 16a' from the laser 12a is focused at an initial focus setting, and then the beam is scanned along a track on the substrate 22 (or along a sample material layer). At operation 404 the current measuring subsystem 28 measures the current flow in real time as the beam 16a' is scanned along the track and records the electronic controller 14 records the average current measured over the full track. At operation 406, the controller 14 then focuses the beam 16a' in a desired incremental step (i.e., to an incrementally different focus setting) and repeats the scanning of the beam 16a' over the full track, and then records the average current measured over the track by the current measuring subsystem 28. At operation 408, the electronic controller 14 checks if all the focus setting have been checked, and if not, repeats operation 406. When all the possible focus settings of the laser 12a have been checked, then at operation 410 the electronic controller 14 identifies the focus setting that created the maximum current flow across the track, and then focuses the beam 16a' of laser 12a to that specific focus setting. The electronic controller 14 may then add that specific focus setting to a calibration data file 36a (FIG. 4) that it maintains in the memory 36 for future manufacturing operations to be carried out by the system 300. At operation 412, the electronic controller 14 may check if all of the lasers of the system 300 have been focused and, if they one or more have not, then at operation 414 the next laser being used in the system that has not yet been focused is selected. Operations 402-410 are then repeated. When the check at operation 412 produces a "YES" answer, then the focusing of each of the lasers 12a, 12b, etc. of the system is complete.

As an alternative to moving the beam along a given track while measuring the resulting current produced from thermionic emission, one may simply hold the laser 12a aimed at a stationary point while changing the focus of the beam 16a' and measuring the current signal produced by thermionic emission. This method maybe be advantageous for confirming focus alignment during a build where scanning laser tracks over the part's surface would damage the part or the tracks are geometrically limited. Prior to the build, the laser scan tracks can simply be performed on the flat, continuous build plate surface.

Once all of lasers 12 have been focused to a minimum spot size, at this point the co-alignment of the lasers may be performed. This process is also shown in FIGS. 5a and 5b. Beginning at operation 416 of FIG. 5a, the beam 16a' of the first selected laser, for example laser 12a, may be aimed at a first target spot on the substrate 22 (or optionally on a powder material layer) and the beam 16b' from a second one of the lasers being used, for example laser 12b, is aimed at the substrate 22 in the vicinity of the first target spot. At operation 418 the electronic controller 14 begins moving the beam 16b' from the laser 12b in a desired pattern, for example and without limitation a raster pattern, around the first target spot. The electronic controller 14 records the magnitude of the current measured by the current measuring subsystem 28, in real time, which is produced by thermionic emission as a result of the combined optical signals from the of the two beams 16a' and 16b', at a plurality of X/Y locations around the first target spot. The electronic controller 14 then identifies the X/Y location where the current signal was at a maximum, and records that X/Y location in the calibration data file 36a.

At operation 420 shown in FIG. 5b, the electronic controller 14 then makes a check if all the predesignated target spots on the substrate 22 have been imaged by the two lasers 12a and 12b. If not, then at operation 422 the electronic controller 14 moves the beam 16a' from the first laser 12a to the next predesignated target spot and aims the beam 16b' in a vicinity of the second predetermined target spot. Operation 418 is then repeated and the X/Y location of the 16b' where the beams 16a' and 16b' together produce the maximum current flow is recorded in the calibration data file 36a. Operations 418-422 are repeated until the check at operation 420 indicates that all of the predetermined target spots on the substrate 22 (build plate) have been checked.

When operation 420 produces a "YES" answer, then a check is made if all of the lasers 12 of the system 300 have been co-aligned. If the answer to this inquiry is "NO", then the electronic controller 14 selects the next laser 12 for co-alignment, and operations 420-422 are repeated. When the check at operation 424 indicates a "YES" answer, then the co-alignment process for all the lasers 12 is finished. It will be appreciated that all of the lasers 12 used in the system 300 may be co-aligned to the first laser 12a, or all of the lasers 12 may be co-aligned to any other laser being used in the system 300.

During the initial focusing of each laser 12, the spacing of the predesignated target spots may be, in one example, every 1 mm such that the substrate is divided into an X/Y grid of 1 mm×1 mm squares. The beam 16a' is then aimed at the center of each 1 mm×1 mm square, and the beam 16b' scanned around the full area of the 1 mm×1 mm square to determine the precise location of the beam 16b' where the current signal produced by the two beams is maximized.

It will also be appreciated that the scanning be done in accordance with other scan patterns, and that the co-alignment process described above is not limited to any specific scanning pattern. For example, the substrate 22 could be divided into a series of concentric rings, and the scanning carried out in a circular pattern around each ring, one ring at a time. Other scanning patterns are also possible.

With the data stored in the calibration data file 36a, the electronic controller 14 can slightly modify the aiming of the laser 12b as both lasers are scanned over the substrate 22, so that the co-alignment of the two lasers 12a and 12b is maintained as the lasers 12a and 12b travel over all areas of the substrate 22.

And while the above discussion has involved co-aligning only two lasers, it will be appreciated that operations 412-418 may be used to co-align any number of independent lasers over the full area of the substrate 22. This feature has significant importance as it enables the focusing of each laser, and the co-alignment of two or more beams, to be quickly and easily checked and calibrated, in situ, without additional equipment being required to be coupled to the system 300, and without complex calibration procedures. This ensures optimum build conditions to best ensure that component parts built using the systems 10 or 300 are built under identical conditions over the full area of the substrate 22, regardless if one laser is used or if multiple lasers are used during the build process. With prior developed systems, these calibration procedures require extensive ex situ analysis and are not routinely performed during each component build.

It will also be appreciated that while the foregoing discussion has focused on the system 10 being implemented in an additive manufacturing system, that the teachings herein are not limited to use with only additive manufacturing systems. The teachings presented herein may be applied to virtually any operation where a material layer needs to be formed on a substrate surface, and the material layer is formed by melting a powder bed, and where it is beneficial to be able to monitor and control the process to optimize a material characteristic of the finished material layer. As such, welding systems, and particularly laser welding systems, may benefit significantly from application of the systems and methods as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for performing laser powder bed fusion, comprising:
    an electronic controller;
    an optical light source controlled by the electronic controller to generate a beam having an output power level, the beam being sufficient in power to selectively laser melt a powder bed layer;
    a current measuring subsystem electrically coupled with at least one of an electrically conductive substrate on which the powder bed layer is deposited or with the powder bed layer deposited on the electrically conductive substrate, and in communication with the electronic controller, for detecting a current flow as at least one of the electrically conductive substrate or the powder bed layer is heated by the beam as the beam is scanned over the powder bed layer and as electrons are displaced by thermionic emission as the powder bed layer is heated by the optical light source, and generating a current flow signal in accordance with the detected current flow, the current flow signal being indicative of a temperature of at least one of the electrically conductive substrate or the powder bed layer; and the electronic controller configured to receive the current flow signal and to use the current flow signal to control a power level of the optical light source to ensure that a temperature of at least one of the electrically conductive substrate or the powder bed layer is at least one of above or below a desired temperature.

2. The system of claim 1, wherein the electronic controller is further configured to apply power control signals to the optical light source in response to the current flow signal, to at least one of increase or decrease the output power level of the optical light source.

3. The system of claim 2, wherein the electronic controller is configured to apply the power control signals to both increase and decrease the output power level of the optical light source as needed, in response to the current flow signal indicating that the temperature is above or below the desired temperature.

4. The system of claim 1, wherein the current measuring subsystem comprises at least one of:
a current preamplifier; and
an ammeter.

5. The system of claim 1, further comprising an analog-to-digital converter for digitizing the current flow signal and providing the digitized current flow signal to the electronic controller for use.

6. The system of claim 1, further including a memory operably associated with the electronic controller for storing information relating to at least one of a desired magnitude of the current flow signal or a desired temperature level, at one of the electrically conductive substrate or the powder bed layer when the beam is scanned.

7. The system of claim 1, further comprising a scan controller responsive to the electronic controller for scanning the beam generated by the optical light source.

8. The system of claim 1, further comprising at least one of:
a display screen operably associated with the electronic controller for enabling a user to monitor operation of the system; and
a user peripheral in communication with the electronic controller for enabling a user to input at least one of data or a command to the electronic controller.

9. The system of claim 1, further comprising:
a memory, and
the electronic controller configured to monitor the current flow signal in real time and to use information stored in the memory to determine whether an under-heating or an over-heating condition exists during the scan, and further to apply power correction signals to the output power level to maintain at least one of a desired level of the current flow signal or a desired temperature level, of at least one of the electrically conductive substrate or the powder bed layer during the scan.

10. The system of claim 1, further comprising:
a user input peripheral in communication with the electronic controller which enables a user to input power level control commands to the electronic controller; and
the electronic controller being configured to receive the power level control commands to increase or decrease the output power level of the optical light source during the scan.

11. The system of claim 1, wherein the electronic controller comprises a field programmable gate array (FPGA).

12. An additive manufacturing system, the comprising:
an electronic controller;
a memory for storing predetermined information relating to at least one of a current level threshold or temperature level threshold;
a laser controlled by the electronic controller to generate a laser beam having an output power level;
a current measuring subsystem electrically coupled with at least one of an electrically conductive substrate on which a powder bed layer is deposited or on the powder bed layer deposited on the electrically conductive substrate, and in communication with the electronic controller, for detecting a current flow as at least one of the electrically conductive substrate or the powder bed layer is heated as the laser is scanned over at least one of the electrically conductive substrate or the powder bed layer and as electrons are displaced by thermionic emission as the powder bed layer is heated by a beam from the laser, and generating a current flow signal in accordance with the detected current flow; and
the electronic controller configured to receive the current flow signal and to use the information stored in the memory and the current flow signal to control the output power level of the laser to maintain at least one of the electrically conductive substrate or the powder bed layer at one of a desired temperature level or within a desired temperature range.

13. The system of claim 12, wherein the current monitoring subsystem comprises at least one of:
a current preamplifier; and
an ammeter.

14. The system of claim 12, further comprising an analog-to-digital converter for converting the current flow signal from an analog signal to a digitized signal.

15. The system of claim 12, further comprising a display screen in communication with the electronic controller for enabling a user to monitor at least one of the current flow signal or a temperature extrapolated from the current flow signal, during the scanning of the laser beam.

16. The system of claim 12, further comprising a user input peripheral in communication with the electronic controller for enabling a user to input at least one of data or commands to the electronic controller.

17. The system of claim 12, wherein the electronic controller is configured to automatically adjust the output power level of the laser while the laser beam is being scanned in response to at least one of the current flow signal or a temperature extrapolated from the current flow signal, to maintain a temperature of the powder bed layer within the desired temperature range.

* * * * *